Patented Feb. 14, 1933

1,897,439

UNITED STATES PATENT OFFICE

HEINRICH NERESHEIMER, OF LUDWIGSHAFEN-ON-THE-RHINE, AND GEORG BOEHNER, OF EDINGEN, GERMANY, ASSIGNORS TO GENERAL ANILINE WORKS, INC., OF NEW YORK, N. Y., A CORPORATION OF DELAWARE

PRODUCTION OF VAT DYESTUFFS OF THE QUINOLINE-ANTHRAQUINONE SERIES AND THE PRODUCTS

No Drawing. Application filed October 29, 1929, Serial No. 403,351, and in Germany November 6, 1928.

The present invention relates to the production of vat dyestuffs derived from phenanthridone.

We have found that valuable new vat dyestuffs are obtained by degradation by oxidation of compounds corresponding to the general formula:

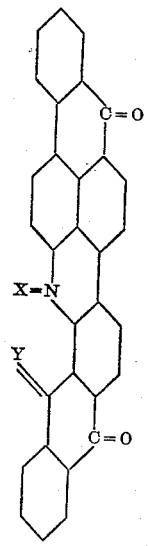

in which the position marked X is occupied by hydrogen or an alkyl group, in which case the position marked Y is occupied by oxygen, or in which the positions marked X and Y are connected to each other by a single nitrogen atom, which compounds may be further substituted. The said initial materials are obtainable, for example, according to the U. S. Patent No. 995,936 or the British specifications Nos. 280,886 and 298,284.

The degradation proceeds with the vigorous evolution of carbon dioxide and very probably leads to derivatives of phenanthridone. Thus from the compound corresponding to the above formula in which X stands for hydrogen and Y for oxygen, a yellow vat dyestuff is obtained which is probably diphthaloyl-phenanthridone having the formula:

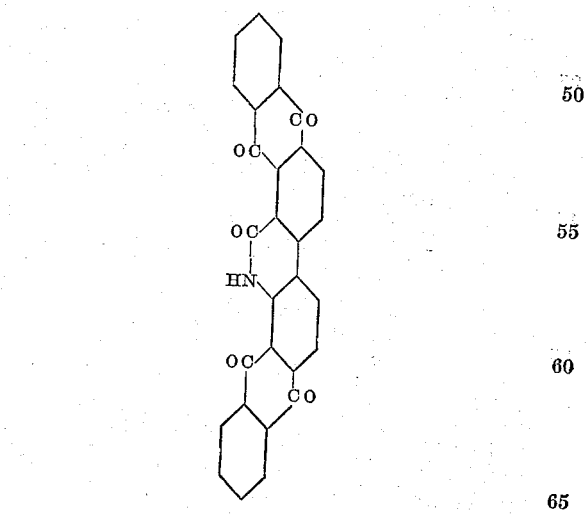

The new dyestuffs, the dyeing shades of which are quite different from those of the initial materials, are generally speaking characterized by the yellow to olive green colorations of their solutions in concentrated sulfuric acid and by the brown to violet coloration of their vats.

The degradation can be carried out by means of a great variety of acid or alkaline oxidizing agents as are capable of splitting up a benzene ring, such as mentioned in "Die Methoden der organischen Chemie" by Houben-Weyl, 2nd edition, vol. 2, pages 133 to 137, and in some cases a special action may be produced by the combination of several oxidation processes in either order.

The following examples will further illustrate how the said invention may be carried out in practice, but the invention is not restricted to these examples. The parts are by weight.

Example 1

An approximately 5 per cent aqueous suspension of the green vat dyestuff obtainable according to Examples 1 to 3 of the U. S. Patent No. 995,936 and corresponding to the formula:

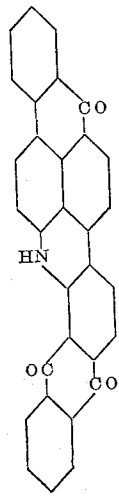

is treated with a solution of sodium hypochlorite at 70° centigrade until the coloration has changed from dark green to yellow brown. The whole is filtered, the filter cake is washed with water and dried, and a brown yellow product is obtained which dissolves in concentrated sulfuric acid giving a yellow olive coloration. The substance dissolves in hot nitrobenzene giving an olive yellow coloration, and crystallizes by cooling in the form of yellow needles grouped in the form of sheaves. The purified dyestuff dissolves in concentrated sulfuric acid to give a yellow solution. Cotton is dyed yellow shades from a brown red vat.

The properties of the dyestuff produced in the manner described in the foregoing example may be further improved by a subsequent acid oxidation by means of for example potassium bichromate in sulfuric acid.

*Example 2*

10 parts of the green vat dyestuff obtainable according to the example of the British specification No. 280,886 and corresponding to the formula:

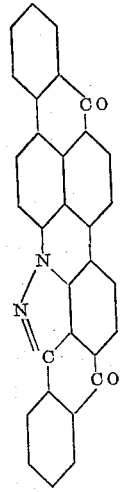

are dissolved in 360 parts of sulfuric acid of 96 per cent strength and 360 parts of ice are introduced into the solution. The whole is then heated to 90° centigrade and 40 parts of crystalline potassium bichromate in small amounts are added. A vigorous evolution of carbon dioxide occurs, and the green color of the suspended particles of the dyestuff changes to yellow. After diluting with water further working up is carried out as described in Example 1; the reaction product is a yellow brown powder which dissolves in concentrated sulfuric acid giving the same coloration. The substance is soluble with difficulty in boiling trichlorbenzene giving a yellow coloration and crystallizes therefrom by cooling in yellow needles arranged in the form of druses. Cotton is dyed yellow shades from a brown violet vat. The new dyestuff probably corresponds to the formula:

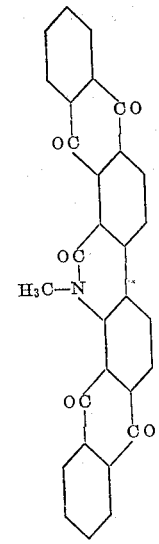

*Example 3*

Potassium bichromate is gradually introduced at from 50° to 60° centigrade into a suspension of 10 parts of finely divided benzanthronepyrazolanthrone, obtainable according to Example 1 of the British specification No. 298,284, and corresponding to the formula:

in 270 parts of a from 60 to 65 per cent solution of sulfuric acid. The conversion is complete when a test portion gives a vat with a violet coloration. The whole is diluted with water and a green powder is obtained after further working up which dissolves in concentrated sulphuric acid giving a yellow olive coloration. Cotton is dyed yellow green shades, fast to chlorine from a violet vat. The dyestuff can be obtained in a form in which it dyes still clearer and more yellowish shades by subjecting it to a subsequent treatment with an oxidizing agent other than that already employed, for example, with potassium permanganate in suspension in dilute sulfuric acid. The dyestuff dissolves in boiling nitrobenzene giving a brown coloration and the solution has a fluorescence of the same color; by cooling the hot nitrobenzene solution small yellow crystals arranged in the form of stars crystallize out.

By warming a suspension of the dyestuff in a 5 per cent aqueous solution of caustic soda at between about 70° and 80° centigrade, splitting of a ring member probably occurs according to the equation:

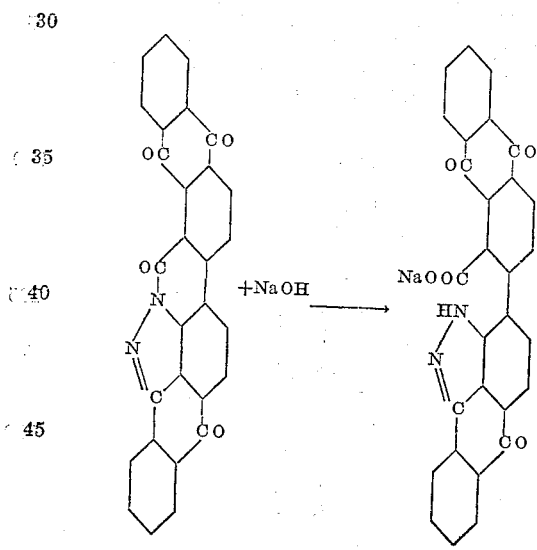

A carmine red solution is obtained probably containing the sodium salt of the new carboxylic acid. The free acid is a light green powder, dissolving in cold solutions of caustic alkalies to give carmine red and in alkaline solutions of hydrosulfite to give a red brown solution. The vat has no affinity to the fibre.

By dissolving the carboxylic acid in chlorsulfonic acid it is again converted already in the cold into the dyestuff.

What we claim is:—

1. As new articles of manufacture vat dyestuffs of the phenanthridone series dissolving in concentrated sulfuric acid to give yellow to olive green solutions and dyeing cotton from yellow to red shades from brown to violet vats, which dyestuffs probably contain the following ring system:

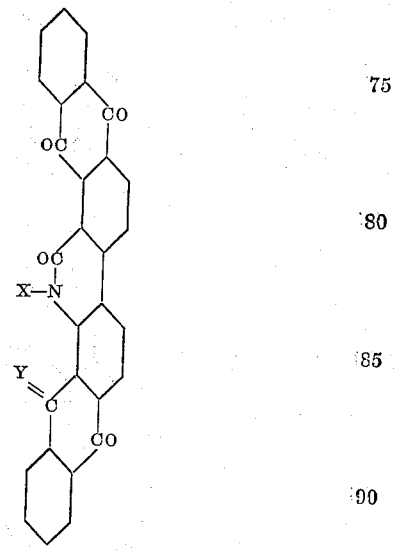

wherein X stands for hydrogen or methyl and Y stands for oxygen.

2. As a new article of manufacture the vat dyestuff crystallizing from nitrobenzene in the form of yellow needles, dissolving in concentrated sulfuric acid to give a yellow solution, dyeing cotton from a brown red vat yellow shades, which dyestuff probably corresponds to the formula:

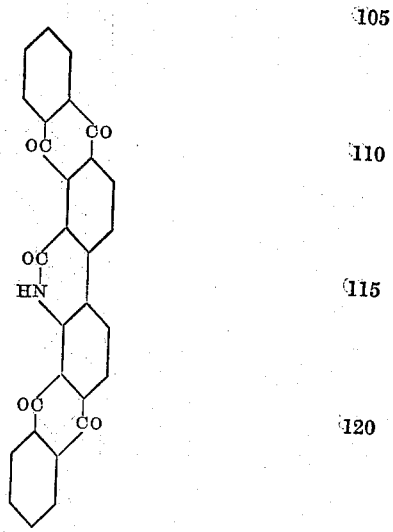

3. The process of producing vat dyestuffs which comprises subjecting to degradation by oxidation by means of an oxidizing agent capable of splitting up a benzene ring compound corresponding to the general formula:

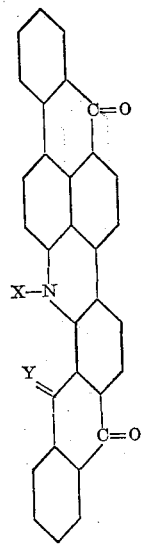

in which the position marked X is occupied by hydrogen or a methyl group, and the position marked Y is occupied by oxygen.

4. The process of producing vat dyestuffs which comprises subjecting to degradation by oxidation successively by means of an alkaline and an acid oxidizing agent capable of splitting up a benzene ring compound corresponding to the general formula:

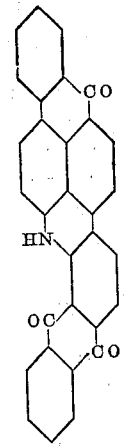

in which the position marked X is occupied by hydrogen or a methyl group, and the position marked Y is occupied by oxygen.

5. The process of producing a vat dyestuff which comprises subjecting the dyestuff corresponding to the formula:

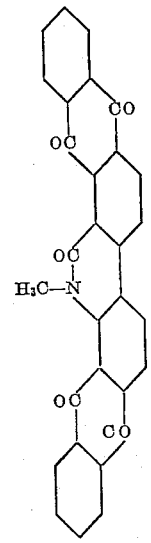

to a degradation by oxidation by means of an alkaline solution of an alkali metal hypochlorite and subsequently by means of an alkali metal bichromate in sulfuric acid.

6. As a new article of manufacture the vat dyestuff crystallizing from trichlorobenzene in the form of yellow needles, dissolving in concentrated sulfuric acid to a yellow-brown solution, dyeing cotton yellow shades from a brown violet vat, which dyestuff probably corresponds to the formula:

In testimony whereof we have hereunto set our hands.

HEINRICH NERESHEIMER.
GEORG BOEHNER.

CERTIFICATE OF CORRECTION.

Patent No. 1,897,439. February 14, 1933.

HEINRICH NERESHEIMER, ET AL.

It is hereby certified that error appears in the printed specification of the above numbered patent requiring correction as follows: Page 4, line 1, claim 3, for the syllable "pound" read "pounds", and line 34, claim 4, for "compound" read "compounds"; and that the said Letters Patent should be read with these corrections therein that the same may conform to the record of the case in the Patent Office.

Signed and sealed this 18th day of April, A. D. 1933.

(Seal)

M. J. Moore.
Acting Commissioner of Patents.